Dec. 18, 1934.    F. B. BELL    1,984,565
VEHICLE SPRING
Filed March 25, 1929    2 Sheets-Sheet 1
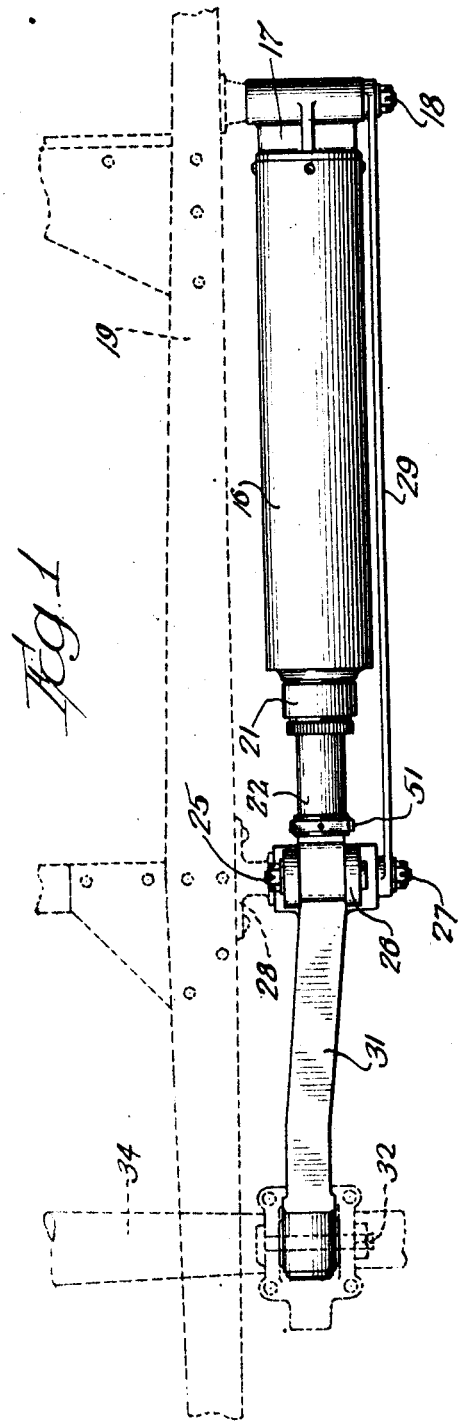
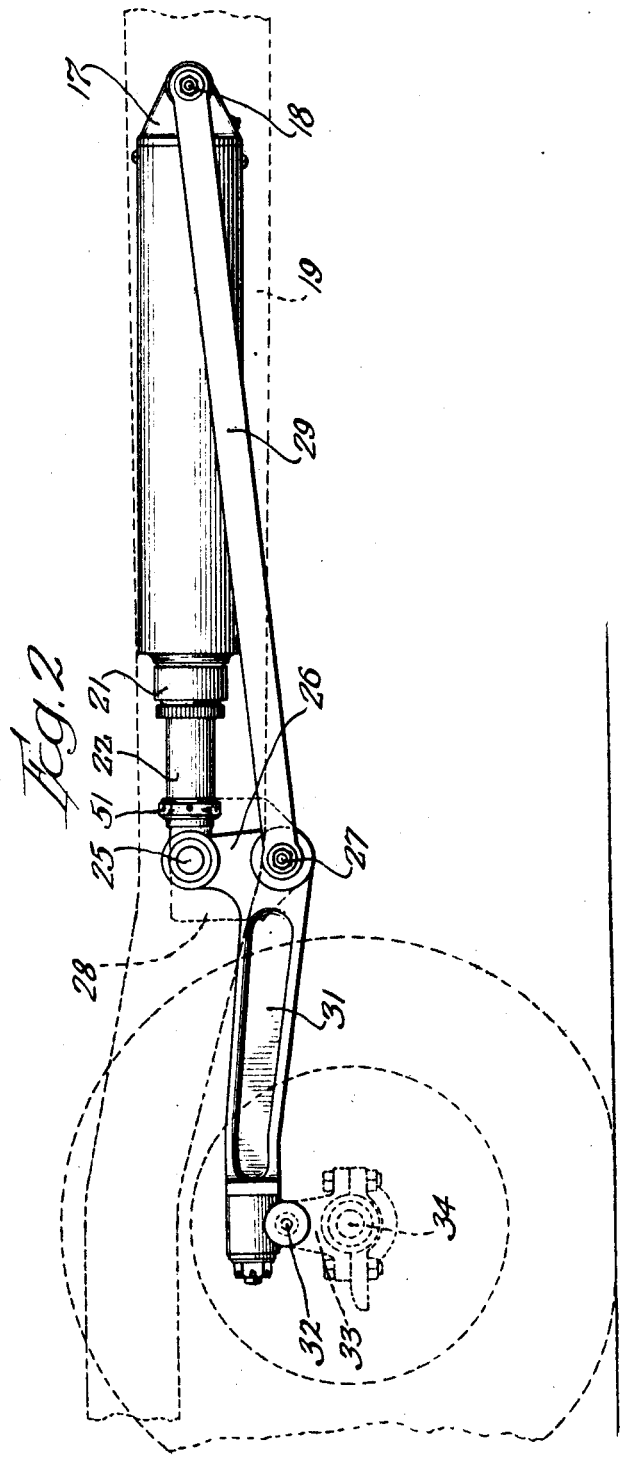
Inventor
Frank B. Bell
John C. Carpenter
Atty Dec. 18, 1934.  F. B. BELL  1,984,565
VEHICLE SPRING
Filed March 25, 1929  2 Sheets-Sheet 2
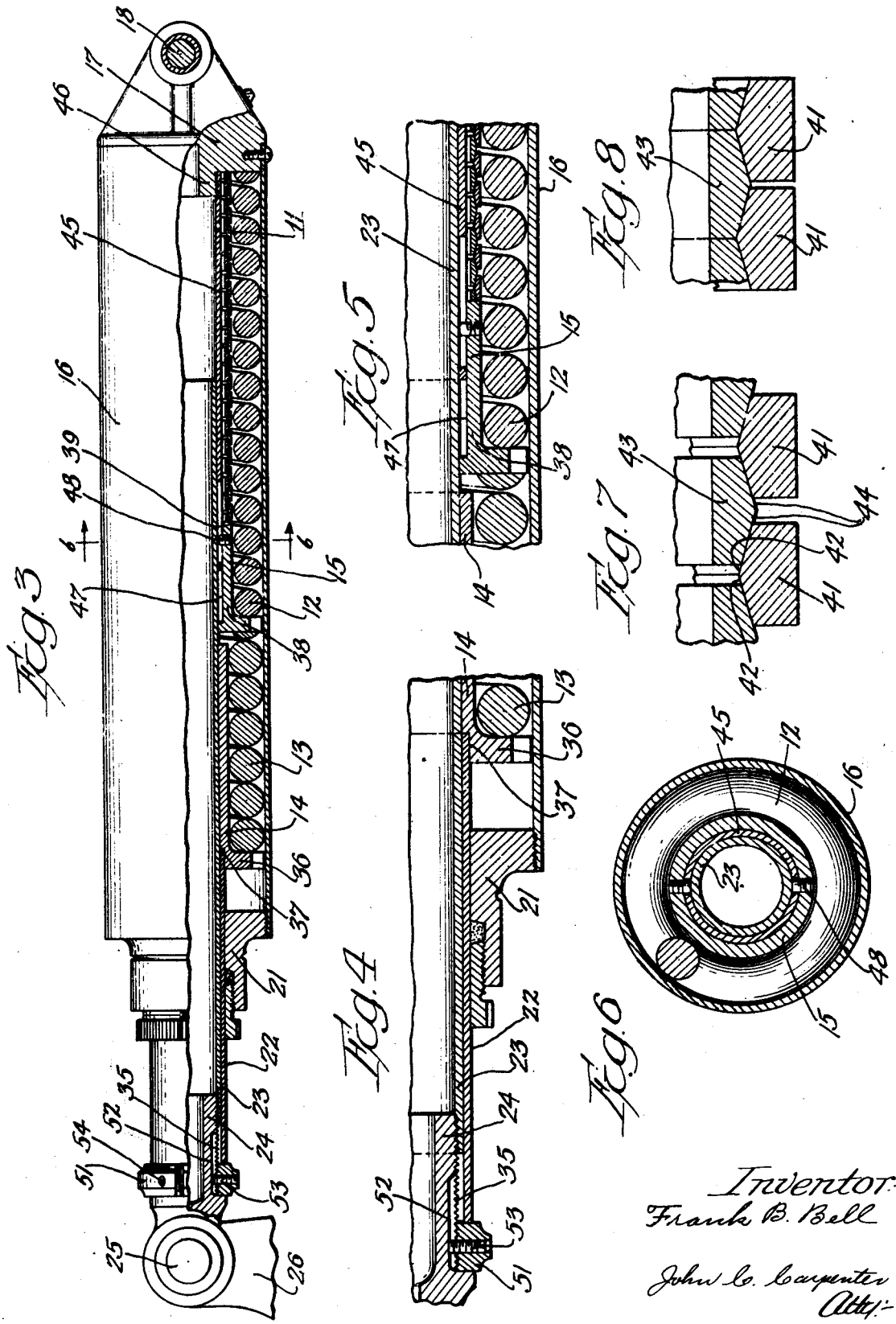

UNITED STATES PATENT OFFICE 1,984,565

VEHICLE SPRING

Frank B. Bell, Pittsburgh, Pa., assignor to Edgewater Steel Company, Pittsburgh, Pa., a corporation of Pennsylvania Application March 25, 1929, Serial No. 349,753

8 Claims. (Cl. 267—20)

This invention relates to vehicle springs, and while it has more particular reference to springs provided for use between the chassis and axle of an automobile, it will be readily manifest that the invention has other and more general application.

The principal object of the present invention is the provision of a spring for an automobile and the like which will be fully responsive to the minor shocks and vibrations, and which will absorb the more severe shocks and jars with minimum recoil or rebound of the vehicle body.

A further important object of the invention is the provision of a spring for automobiles and the like, wherein severe shock or jar is dissipated in large part in friction with corresponding reduction in recoil action.

Another important object of the invention is the provision of a spring assembly inherently providing improved riding qualities, the parts of which will be so constructed and arranged as to permit ready substitution for the usual single and double cantilever springs now generally in use.

Numerous other objects and advantages of the invention will be apparent as it is better understood from the following description, which, taken in connection with the accompanying drawings, discloses a preferred embodiment thereof.

Referring to the drawings:

Figure 1 is a top plan view of an automobile spring embodying my invention, portions of the automobile being shown in dotted lines;

Fig. 2 is a side view thereof;

Fig. 3 is an enlarged side view, a portion of the spring parts being shown in section;

Figs. 4 and 5 together constitute an enlarged partial section similar to the section shown in Fig. 3;

Fig. 6 is a section taken substantially on the line 6—6 of Fig. 3; and

Figs. 7 and 8 are enlarged sectional details of the friction or ring spring forming an element or member of the spring assembly shown in Figs. 1 to 6.

The ring spring assembly shown on the drawing, and which constitutes the at present preferred embodiment of this invention, comprises an association of friction and non-friction springs, the friction springs being preferably the ring springs suitably proportioned and dimensioned, which are shown, described, and claimed in United States Letters Patents to Kreissig, No. 1,515,346, and the non-friction springs are of the usual coil construction. The friction springs of this Kreissig patent, No. 1,515,346, are composed of non-resilient rings, the spring action being accomplished by the stretching and compression of the internal structures of the members themselves, as contradistinguished from and tending to a change of shape.

Referring first more particularly to Fig. 3, reference character 11 generally designates the ring or friction spring, reference character 12 a coil or non-friction spring arranged for simultaneous compression with the friction spring 11, and reference character 13 a second non-friction or coil spring which, as will be presently more fully described, receives and absorbs the minor shocks and jars of service. The springs 11 and 12 are arranged parallel to each other, and the spring 13 in series with the springs 11 and 12, and this last mentioned spring is compressed in the initial spring contraction. The spring 13 is mounted in a movable sleeve 14 adapted for engagement with a second sleeve 15 after a predetermined portion of the spring travel. The initial spring action is confined largely or entirely to the spring 13. Upon continuation of the spring compression after engagement of the sleeve 14 with the sleeve 15, the yielding resistance of the spring assembly is confined to the springs 11 and 12.

The three springs 11, 12, and 13 are mounted within a casing, which is or may be formed of a sheet metal cylindrical barrel or tube 16 closed at one end with an imperforate head 17 pivoted at 18 to a fixed pivot or arm on the chassis, generally indicated in dotted lines at 19 in Fig. 1. The opposite end of the tube or barrel 16 is closed in part by a head 21 having a central opening through which two concentric sleeves 22 and 23 are arranged for sliding movement in the compression and expansion of the springs. The sleeve 23 constitutes a guiding member for the associated reciprocating parts, as will be presently explained. It is connected at its end, which extends outside the casing, with a threaded cylindrical arm 24, this arm being pivoted at 25 to one arm 26 of a bell-crank lever pivoted at 27 on a bracket 28 secured to the chassis and extending down beneath it, a tie or reinforcing bar 29 being arranged to connect the pivot members 27 and 18 to provide rigidity. The other arm 31 of this bell-crank lever extends above and is pivoted at 32 to a housing 33 fixed upon the vehicle axle 34, it being understood that a spring assembly and attendant mechanism is mounted at each side of the chassis and connected to the axle 34.

The arm 24 is threaded from its free end to adjacent its pivot 25, as indicated at 35, the guiding sleeve 23 being screwed on to the threaded end. The sleeve 22 extends into the casing into engagement with the sleeve 14 earlier mentioned and which directly imparts the compression force first to the spring 13 and thereafter to the sleeve 15. The sleeve 14 is provided with a peripheral flange 36 against which the spring 13 has bearing. The sleeve 14 is cut away at 37 to provide a shoulder for receiving the end of the sleeve 22. The sleeve 15 is also provided with a peripheral shoulder 38 against which the spring 13 has normal bearing at one side and the spring 12 at the other, this spring 12 being positioned between this shoulder 38 and the closed head 17 of the casing.

The ring spring assembly preferably comprises two sets of rings, each member of each set being continuous and circular. The cross-sectional form of the rings of the ring spring assembly is disclosed in Figs. 7 and 8, from which it will be noted that the outer rings indicated by reference character 41 are provided with oppositely beveled faces 42 at their inner sides and that the inner rings indicated by reference character 43 have outer faces 44 correspondingly beveled and engaging the adjacent beveled faces of adjacent rings 41.

By way of explanation, it may be mentioned that in the compression of this spring the outer rings 41 resist expansion and the inner rings compression, movement of the rings being possible from the position shown in Fig. 7 to the position shown in Fig. 8. A spring ring comprised of these units thus alternately arranged has been found to dissipate a large percentage of the force of compression in friction with resulting diminution of recoil force.

An inner casing or sleeve 45 is fixed to a central boss 46 of the casing head 17 and this sleeve 45 has telescoping engagement with the sleeve 23. The sleeve 45 is provided with slots 47 and set-screws or pins 48 are arranged through the sleeve 15 to extend into the slots and prevent relative rotation of these parts. The ring spring is positioned between the end of the sleeve 15 and the casing head 17. The sleeve 22 which embraces the sleeve 23, and also extends outside the casing, bears, as has been explained, against the adjacent end of the sleeve 14 and it bears also against an adjustable collar 51 mounted upon the threaded shank of the arm 24, this collar being adapted to be rotated to vary the extent of travel of the coil spring 13, as will be readily understood.

The arm 24 is provided with a slot 52 into which may enter a set-screw 53 adapted to be positioned through one or another of threaded openings 54 of the collar 51. Adjustment of the sleeve 22 determines the range of movement of the spring 13 in compression, as may be needed to render the vehicle more or less sensitive to the minor compressive movements of the spring as results from mere undulations and waves in the road. It will be apparent that the relative proportioning of the springs 11 and 12 can be accomplished to provide the desired resistive and shock absorbing characteristics, it having been found that where the springs 11 and 12 are of substantially equal power, excellent riding qualities result.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A spring assembly for automobiles and the like, comprising a friction spring and a coil spring arranged to conjointly sustain the severe shocks of service, and a second coil spring arranged in tandem with said first mentioned springs for sustaining the minor shock and vibrations.

2. A spring assembly for automobiles and the like, comprising a friction spring and a flexure spring arranged in parallel, and a second flexure spring arranged in tandem with said parallelly arranged springs.

3. In an automobile, the combination of a chassis, a body, a spring assembly supporting said body from said chassis and comprising a friction spring and a flexure spring, the weight of the body being normally carried by said flexure spring, and a second flexure spring cushioning the action of said friction spring under severe shocks.

4. In an automobile, the combination of a chassis, a body, a casing pivotally mounted at an end of the body, friction and coil springs within said casing, a plunger within the casing and engaging said springs, and means connected to the chassis for transmitting vibration and shocks through said plunger to said springs.

5. A spring assembly for automobiles and the like, comprising three spring units, two of which are of flexure spring type and the third of which is a ring spring, said ring spring and one of the spring units of said flexure type being arranged in parallelism with each other and in series with the remaining flexure unit.

6. A spring assembly for automobiles and the like, comprising three spring units, two of which are of flexure spring type and the third of which is a ring spring, said ring spring and one of the spring units of said flexure type being arranged in parallelism with each other and in series with the remaining flexure unit, and means for positively transmitting force of impact past the last mentioned flexure spring unit and to said ring spring and said flexure spring in parallel.

7. A spring support for automobiles and the like, comprising a casing, a member movable axially of the casing in accordance with vibrations and shocks sustained by the vehicle, a coil spring mounted within the casing and embracing said member, a ring spring assembly mounted within the casing and about said member, a coil spring in the casing and of coincident travel with said ring spring, and a plunger engaging said ring spring and the coil spring in parallelism with it and initially receiving movement compressing said springs through pressure of the first mentioned coil spring.

8. A spring support for automobiles and the like, comprising a casing, a member movable axially of the casing in accordance with vibrations and shocks sustained by the vehicle, a coil spring mounted within the casing and embracing said member, a ring spring assembly mounted within the casing and about said member, a coil spring in the casing and of coincident travel with said ring spring, and a plunger engaging said ring spring and the coil spring in parallelism with it and initially receiving movement compressing said springs through pressure of the first mentioned coil spring, said plunger being engageable by said member to transmit pressure direct to said springs in parallelism.

FRANK B. BELL.